United States Patent [19]
van Os et al.

[11] Patent Number: 5,349,271
[45] Date of Patent: Sep. 20, 1994

[54] ELECTRODELESS DISCHARGE LAMP WITH SPIRAL INDUCTION COIL

[75] Inventors: Ron van Os, Sunnyvale; Derek Bray, Los Altos, both of Calif.

[73] Assignee: Diablo Research Corporation, Sunnyvale, Calif.

[21] Appl. No.: 36,303

[22] Filed: Mar. 24, 1993

[51] Int. Cl.⁵ .............................................. H05B 41/16
[52] U.S. Cl. ...................................... 315/248; 315/39; 313/161
[58] Field of Search .................... 315/248, 34, 39, 283, 315/344; 313/161, 318, 51

[56] References Cited

U.S. PATENT DOCUMENTS

| | | | |
|---|---|---|---|
| 4,070,603 | 1/1978 | Regan et al. | 315/344 |
| 4,286,230 | 8/1981 | Morrison et al. | 315/39 |
| 4,422,017 | 12/1983 | Denneman et al. | 315/344 |
| 4,661,746 | 4/1987 | Postma et al. | 315/248 |
| 4,705,987 | 11/1987 | Johnson | 313/161 |
| 4,922,157 | 5/1990 | Van Engen et al. | 315/248 |
| 4,963,792 | 10/1990 | Parker | 315/248 |
| 5,013,975 | 5/1991 | Ukegawa et al. | |
| 5,148,085 | 9/1992 | Kroes | 315/248 |

FOREIGN PATENT DOCUMENTS

42146  5/1933  France ................................. 315/248

OTHER PUBLICATIONS

Hollister, Donald D., "A Xenon Lamp With Two less Electrodes", Electro-Optical Systems Design, Feb. 1971, pp. 26–30.

*Primary Examiner*—John T. Kwon
*Attorney, Agent, or Firm*—Skjerven, Morrill, MacPherson, Franklin & Friel

[57] ABSTRACT

An electrodeless discharge lamp includes a discharge vessel containing an ionizable vapor, a generator for providing a high frequency signal, and an induction coil adjacent the discharge vessel and connected to the generator. The induction coil is shaped in the form of a planar spiral. The spiral coil is formed of wire or made of metal etched in a spiral pattern onto a substrate. The electrodeless discharge lamp having a spiral induction coil shows low lumen depreciation, a high linear relationship between light output and power input and produces low radio frequency interference.

16 Claims, 13 Drawing Sheets

ELECTRODELESS DISCHARGE LAMP WITH SPIRAL INDUCTION COIL

BACKGROUND OF THE INVENTION

1. Field of the Invention

This invention relates generally to electrodeless discharge lamps, and more particularly to the configuration of the induction coil in an electrodeless discharge lamp.

2. Description of the Prior Art

Electrodeless discharge lamps generally deliver a highly consistent light output over a long life. The most common structure of this kind of lamp includes an induction coil positioned inside or around the outer surface of a discharge vessel. The coil is used to generate an electromagnetic field inside the discharge vessel.

Figure 1:
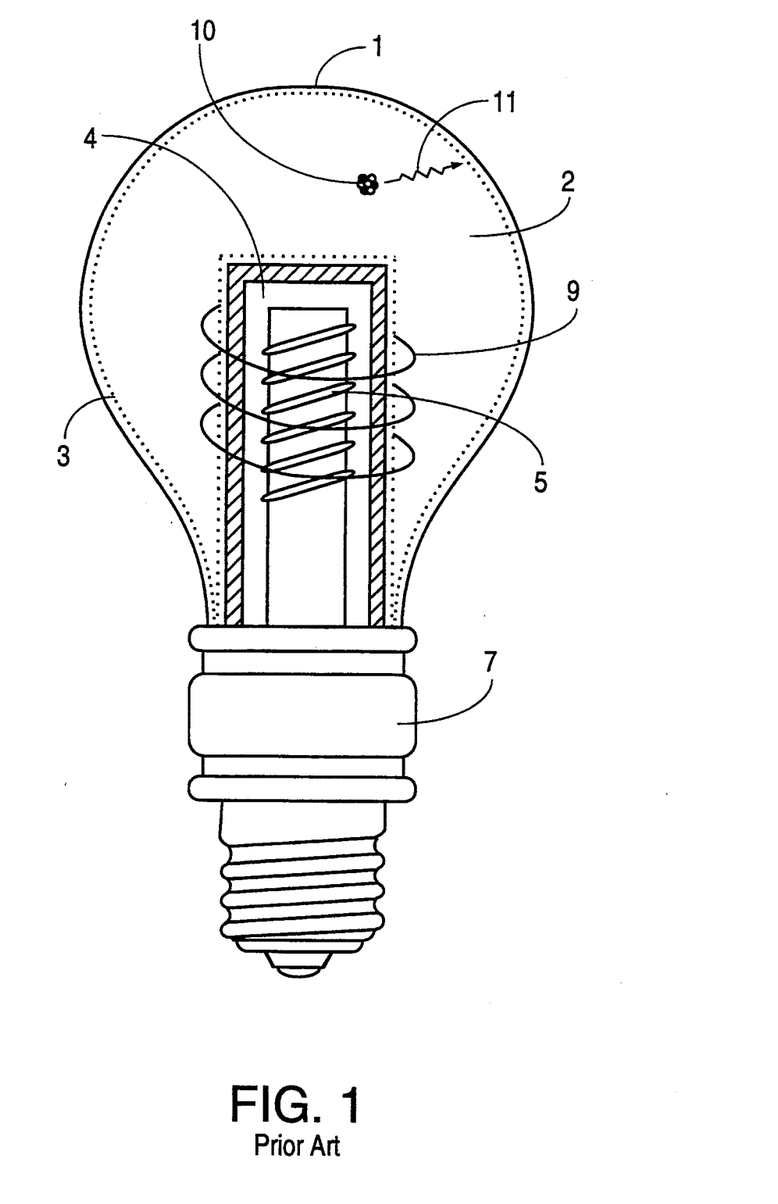
FIG. 1 illustrates a schematic diagram of a prior art electrodeless discharge lamp, showing the principal parts of the lamp.

U.S. Pat. No. 4,010,400 describes a lamp device of the kind illustrated in FIG. 1 hereof, wherein a solenoidal or helical induction coil is located in the center of the bulb. As shown in FIG. 1, lamp bulb 1 includes a glass discharge vessel 2 containing a noble gas and a metal vapor. The inner surface of vessel 2 is coated with a fluorescent powder 3, and the vessel is formed around a cylindrical cavity 4 wherein induction coil 5 is placed. A high frequency (HF) generator (not shown) located inside a base 7 generates a high frequency signal to feed induction coil 5.

Figure 2:
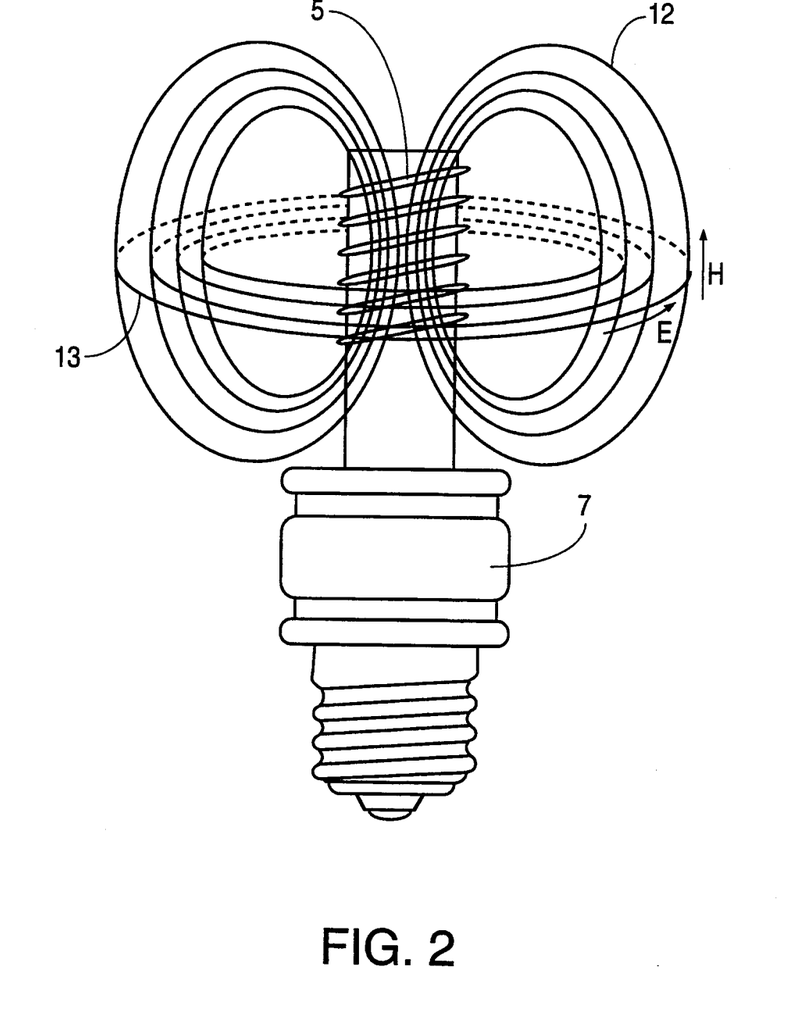
FIG. 2 illustrates the general shape of the electrical and magnetic lines of force generated by the induction coil of the lamp shown in FIG. 1.

The operation of the lamp is well known in the art and will be summarized briefly. When the high frequency signal generated by the HF generator is applied to induction coil 5, coil 5 induces an alternating magnetic field H in discharge vessel 2. The alternating magnetic field H in turn induces a secondary electric field E in the discharge vessel 2. FIG. 2 illustrates the general shape of the electrical lines 13 and magnetic lines 12 around the induction coil 5. When the lamp is energized, electrons in the discharge vessel are accelerated by the secondary electric field, forming an electric current 9 (FIG. 1), and the accelerated electrons collide with atoms 10 of the vapor metal. Some of the metal atoms 10 are ionized to maintain the electrical current, but most are excited to a higher energy state. The excited metal atoms fall back from the higher energy state and emit photons 11, predominantly in the ultraviolet range. The ultraviolet photons 11 interact with the fluorescent powder 3 on the bulb wall to generate visible light.

U.S. Patent No. 5,013,975 to Ukegawa discloses an electrodeless discharge lamp in which a substantially helical induction coil surrounds the discharge vessel.

Figure 3:
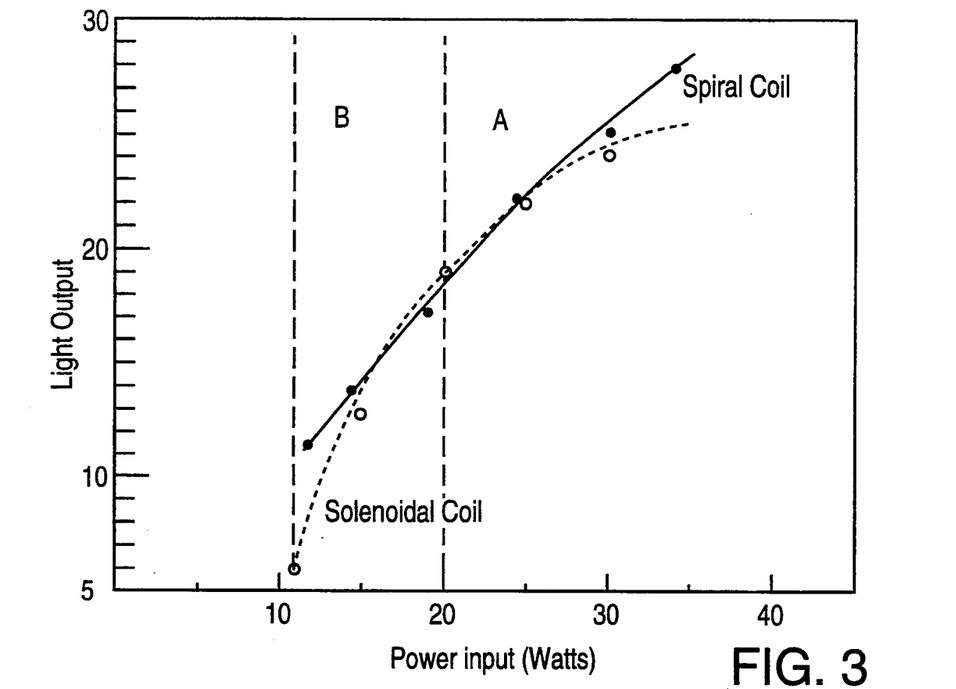
FIG. 3 illustrates diagrams of the dimming characteristics of a prior art electrodeless discharge lamp device and the discharge lamp in accordance with the present invention.

One problem with electrodeless discharge lamps is that their dimming characteristics have generally been very nonlinear. As shown in FIG. 3 (dashed line), the initial decrease in power (region A) causes slight changes in light output that are almost undetectable by the eye; with further reductions in power, the light output drops off rapidly (region B). In short, light output is not a linear function of input power. This means that the efficiency of the lamp varies with input power, and this in turn makes scaling of the lamps difficult. The design of a 12 watt bulb, for example, must be totally different from the design of a 25 watt bulb. A third problem is that electrodeless discharge lamps emit radio frequency interference (RFI) which must be kept to acceptable levels in order not to interfere with radios and other communications equipment.

SUMMARY OF THE INVENTION

Accordingly, one object of the present invention is to provide an electrodeless discharge lamp which displays a substantially linear relationship between its light output and input power, thereby providing good dimming control characteristics.

Another object of the present invention is to provide an electrodeless discharge lamp for which the light output can easily be scaled up or down simply changing the input power, without the need to re-engineer the discharge vessel and/or induction coil for optimum efficiency.

Another object of the present invention is to provide an electrodeless discharge lamp, the induction coil of which generates a strong near-field and a weak far-field radiation, thereby producing less radio frequency interference than prior art lamps.

Another object of the present invention is to provide an electrodeless discharge lamp which is compact, has a shape similar to conventional incandescent lamps and can be used as a replacement therefor.

Another object of the present invention is to provide an electrodeless discharge lamp having a induction coil which is easy and inexpensive to manufacture and is mechanically stable over a broad range of operating temperatures.

Another object of the present invention is to provide an electrodeless discharge lamp which has an operating life that is significantly longer than lamps which use solenoid coils.

In accordance with the present invention the induction coil of an electrodeless discharge lamp includes a spiral coil lying substantially in a single plane. The planar spiral coil may be formed of a wire conductor or of metal formed in a spiral pattern on a substrate.

In accordance with one aspect of the present invention the coil consists of a single planar spiral, while according to another aspect of the present invention, the coil is wound in a double spiral. In a preferred embodiment, substantially planar spirals are formed on both sides of the substrate. The inner or outer terminals of each spiral are tied together to form a center tap of the coil, providing a double-sided coil which produces a more localized electric field and less radio frequency interference. This coil may be balanced by passing the conductive path through the substrate at additional points besides the center tap.

In accordance with another aspect of the present invention, a ferrite core is used in conjunction with a planar spiral coil to focus the magnetic field into the discharge vessel.

The above and other objects, features and advantages of the present invention will be apparent from the following detailed description of the invention in conjunction with the drawings.

BRIEF DESCRIPTION OF THE INVENTION

DETAILED DESCRIPTION OF THE INVENTION

Figure 4:
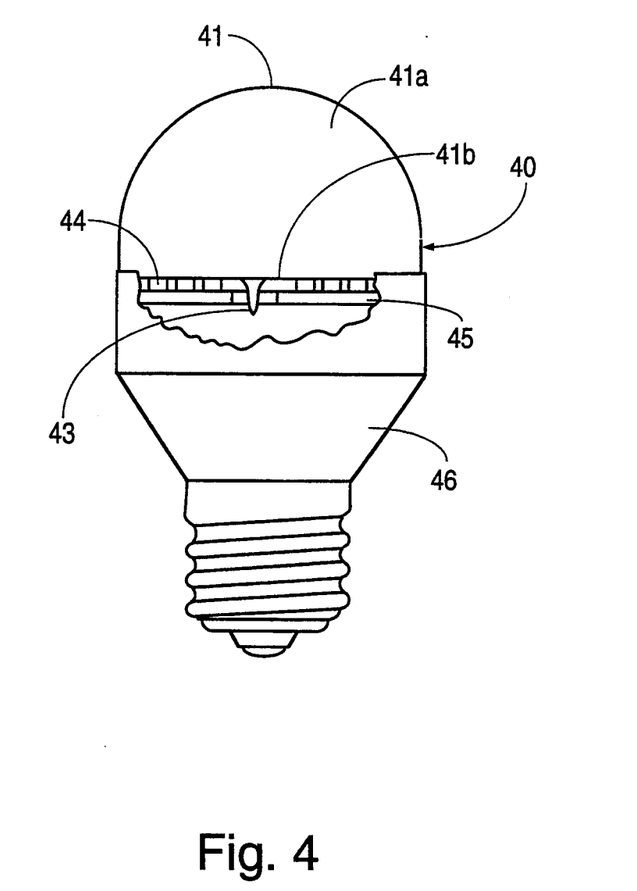
FIG. 4 illustrates a partially broken-away side view of an electrodeless discharge lamp in accordance with the present invention.
Figure 5:
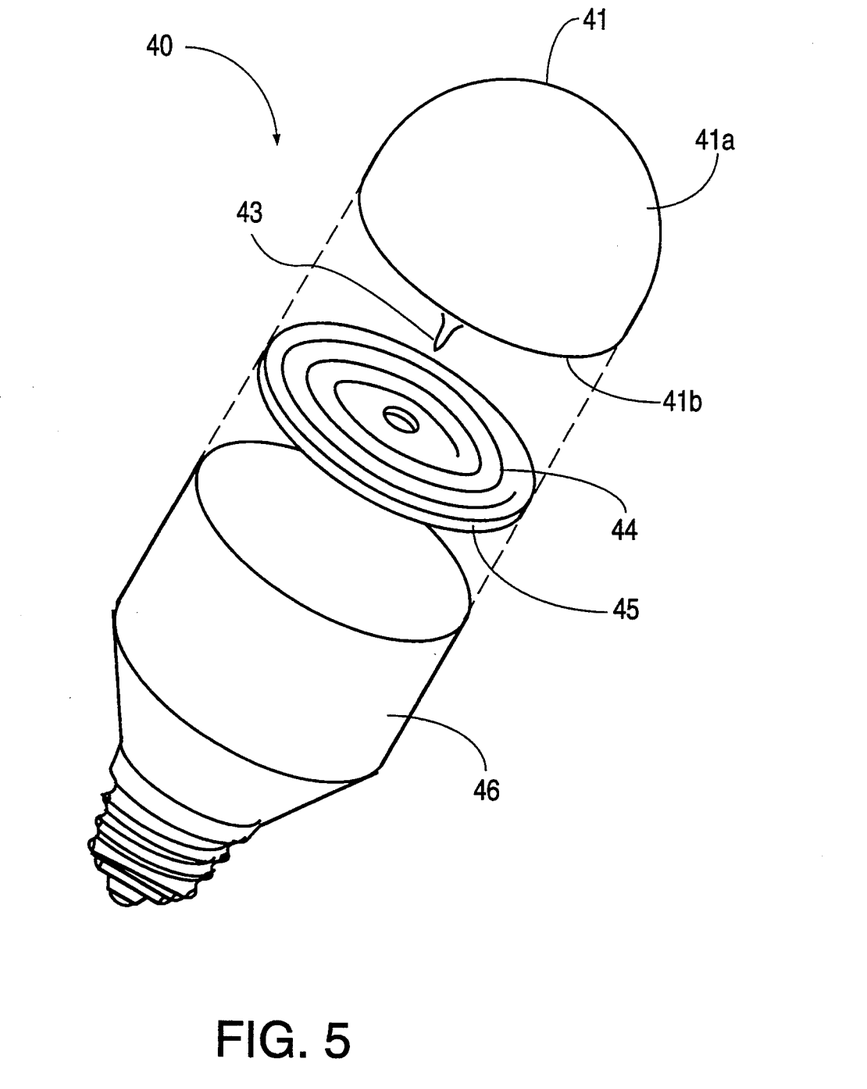
FIG. 5 illustrates an exploded view of the electrodeless discharge lamp of FIG. 4 showing the major parts of the lamp.

Reference is now made to FIGS. 4 and 5 in which an electrodeless discharge lamp 40, in accordance with the present invention, includes a discharge vessel 41 which has an arched light-emitting surface 41a and a circular, substantially flat bottom surface 41b with a small exhaust tube 43 projecting downward from the center thereof. Beneath the bottom surface 41b is an induction coil 44, which is in a spiral shape and substantially in a single plane. The flat spiral coil 44 has several turns (for example, four turns) which are located near the circumference of bottom surface 41b. (It has been found that continuing the spiral coil all the way to the center of surface 41b does not increase the efficiency of the lamp significantly.) Coil 44 consists of metal formed in a spiral pattern on a substrate 45; alternatively, it could be made of a wire conductor formed in a spiral pattern. The substrate is preferably a ceramic or low-loss printed circuit board, or it can be any other substrate known in the art. The coil may consist of a single planar spiral or, as described below, it may be formed in a double-sided spiral configuration.

FIGS. 6–9 illustrate several configurations of an induction coil in accordance with this invention. While these configurations show metal conduction paths formed on a substrate, it will be apparent that each of these embodiments may be constructed with any type of conduction path, e.g., ordinary wire conductors.

Figure 6A:
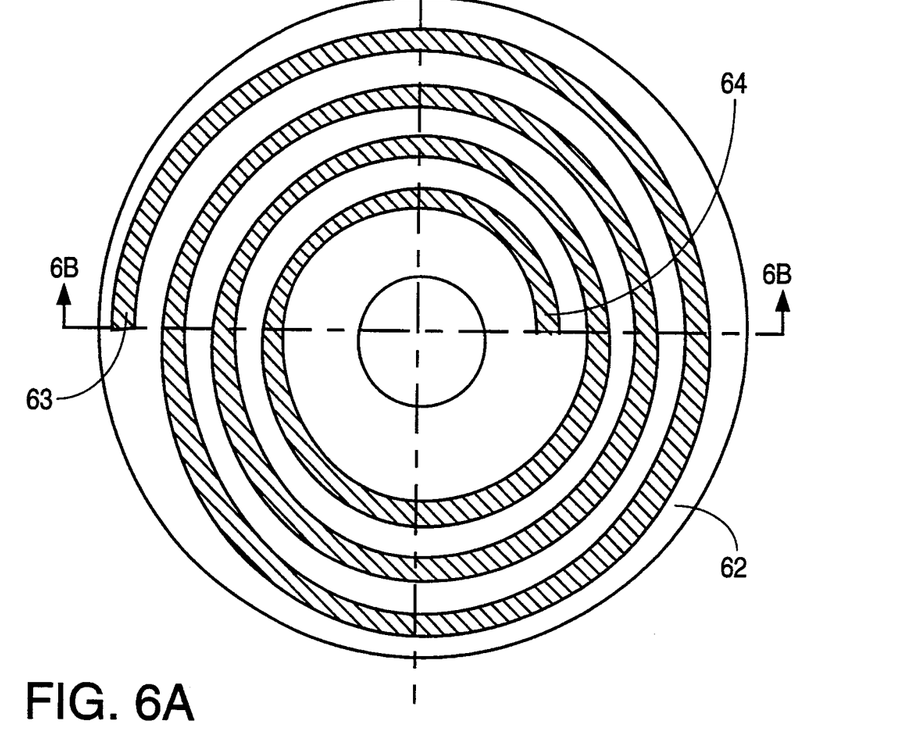
FIG. 6A illustrates a top plan view of a spiral coil etched on one side of a substrate.
Figure 6B:
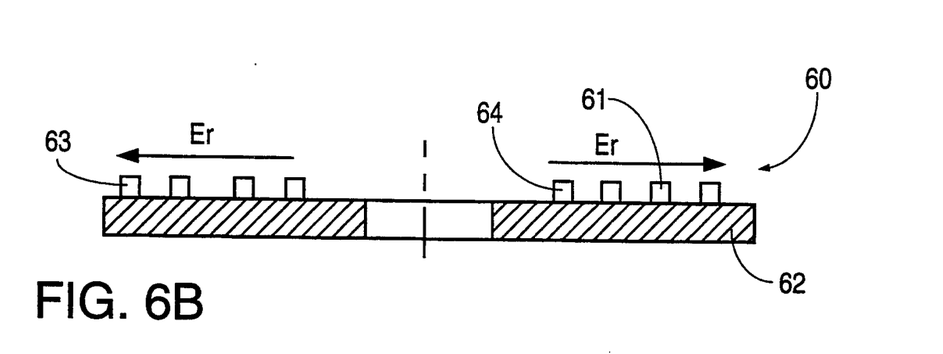
FIG. 6B illustrates a cross-sectional view of the spiral coil shown in FIG. 6A.

FIG. 6A illustrates a top plan view of a single-sided coil in accordance with this invention, and FIG. 6B illustrates a cross-sectional view of the same coil taken at section 6B—6B shown in FIG. 6A. Coil 60 includes a conductive path 61 which is formed on an annular substrate 62. The terminals of coil 60 are located at the points designated 63 and 64, respectively.

Figure 7A:
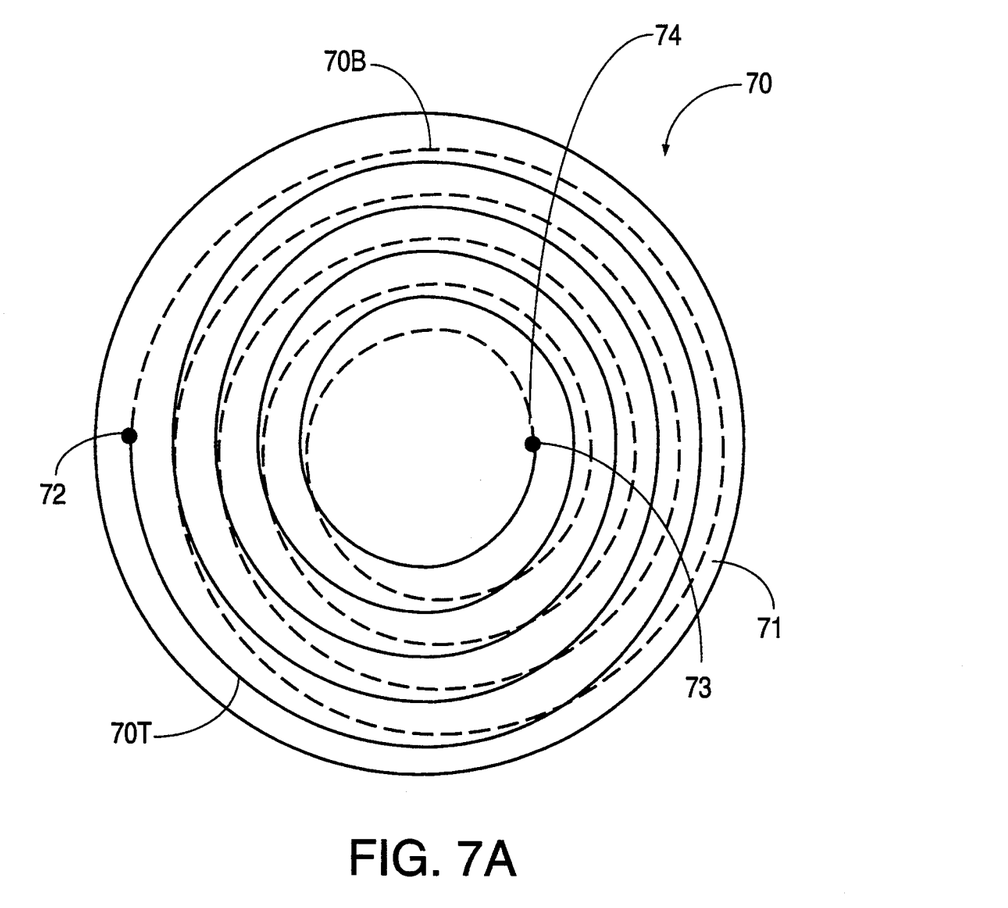
FIG. 7A illustrates a top plan view of a double-sided spiral coil formed on both sides of a substrate.
Figure 7B:
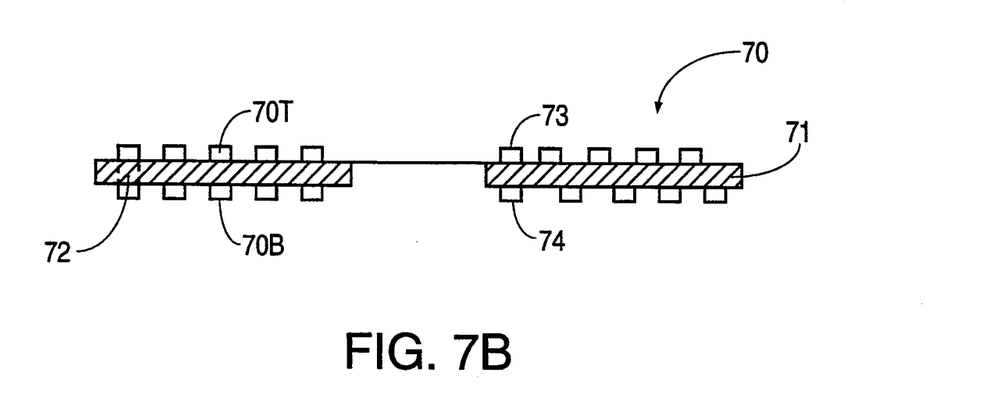
FIG. 7B illustrates a cross-sectional view of the coil shown in FIG. 7A.

FIGS. 7A and 7B illustrate, respectively, a top plan view and a cross-sectional view of a double-sided coil. FIG. 7B is taken at the section designated 7B—7B in FIG. 7A. Double-sided coil 70 is formed on a substrate 71. The portion of coil 70 on the top side of substrate 71 is designated 70T and the part of coil 7 on the bottom side of substrate 71 is designated as 70B. Top portion 70T and bottom portion 70B are linked at a circumferential crossover 72 in substrate 71, which may be formed in a hole or via through substrate 71. The terminals of coil 70 are designated 73 and 74, respectively. For the sake of clarity, top portion 70T and bottom portion 70B are illustrated in FIG. 7A by lines which represent the center line of the conduction paths, top portion 70T being represented by a solid line and bottom portion 70B being represented by a dashed line.

As will be apparent from a close examination of FIGS. 7A and 7B, the current flowing in coil 7 begins at one of terminals 73 or 74, proceeds spirally outward to crossover 72, and then returns inward to the other of terminals 73 or 74. It will also be noted that the conduction paths in portions 70T and 70B are located directly over one another on the left hand side of FIGS. 7A and 7B (where they "cross") and at alternate positions on the right side of FIGS. 7A and 7B. The currents in portions 70T and 70B flow in the same angular direction (clockwise or counterclockwise) around the center of substrate 71. While these relationships are found in the embodiment shown in FIGS. 7A and 7B, they are not critical and numerous alternative embodiments in accordance with the principles of this invention may be devised by those skilled in the art.

Figure 8:
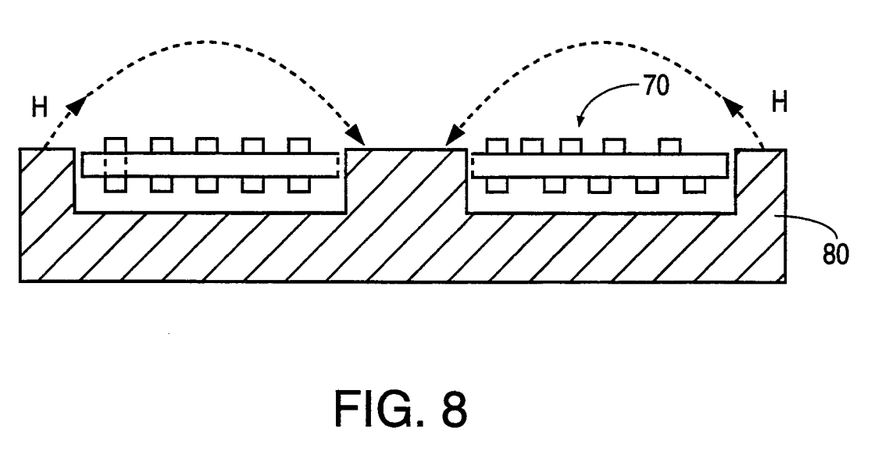
FIG. 8 illustrates a cross-sectional view of a spiral coil having a ferrite core to focus the magnetic field into the discharge vessel.

FIG. 8 shows double-sided coil 70 positioned adjacent a ferrite core 80. As seen from FIG. 8, in this embodiment magnetic fields are advantageously concentrated into the upper hemisphere, thereby producing a stronger and more localized field.

Figure 9A:
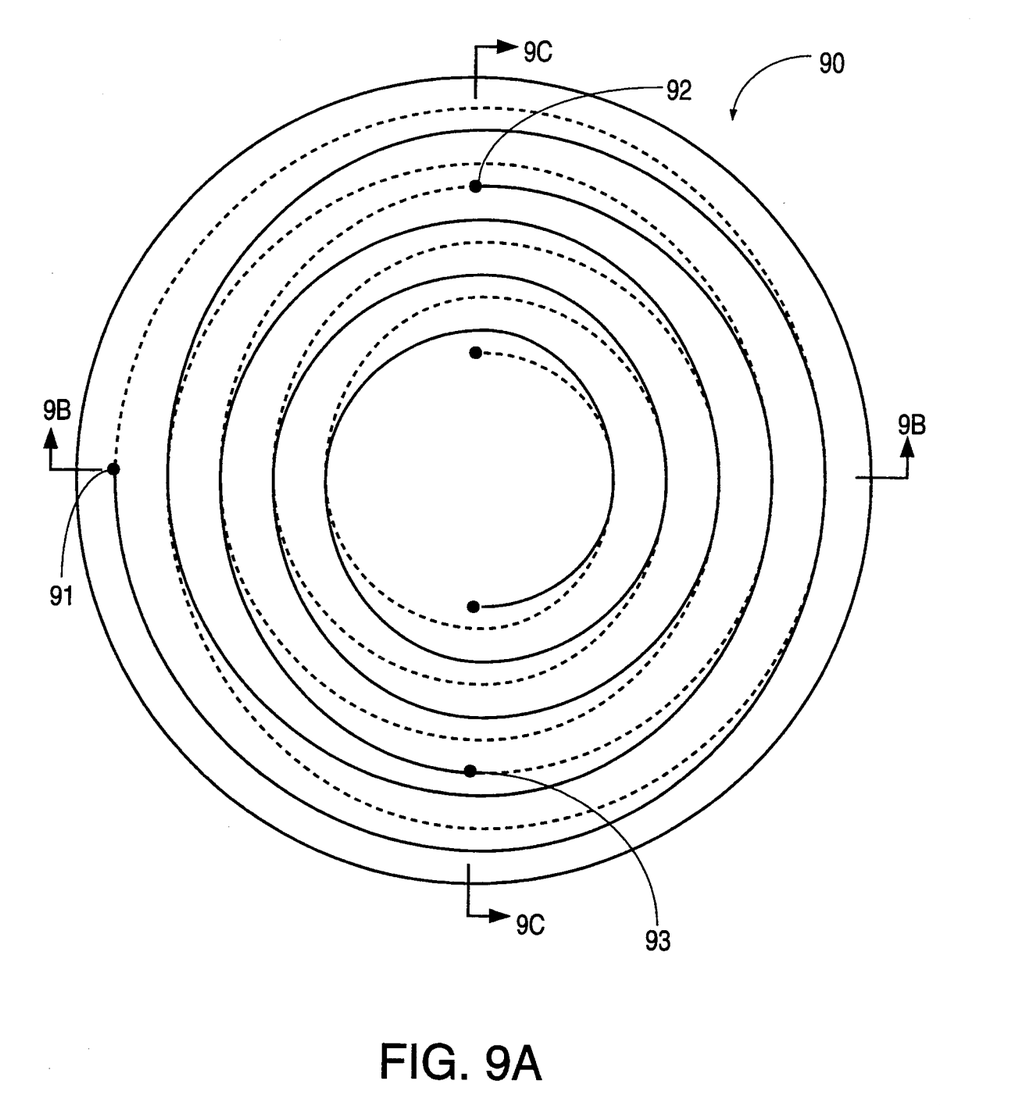
FIG. 9A illustrates a top plan view of a "balanced" double-sided coil.
Figure 9B:
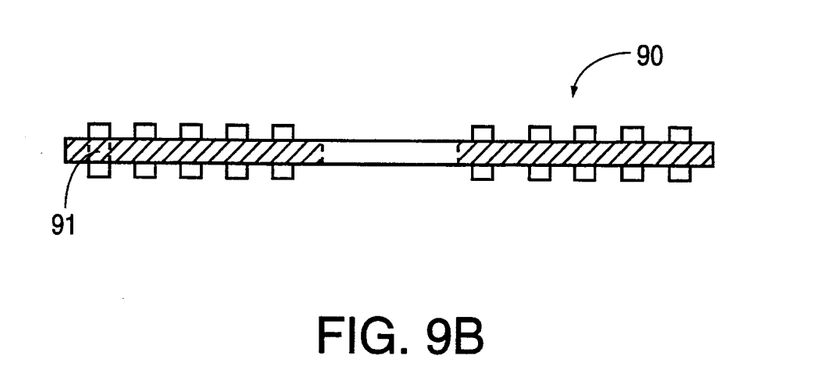
FIGS. 9B and 9C illustrate cross-sectional views of the coil shown in FIG. 9A.
Figure 9C:
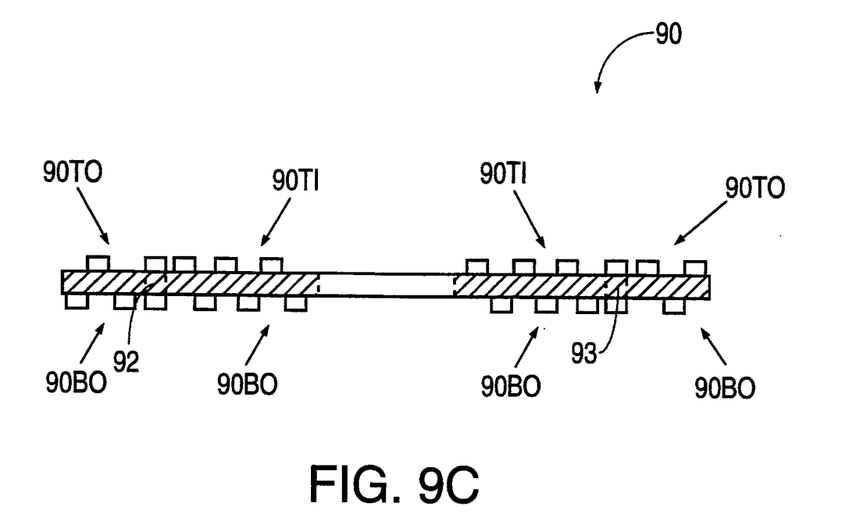
Figure 9D:
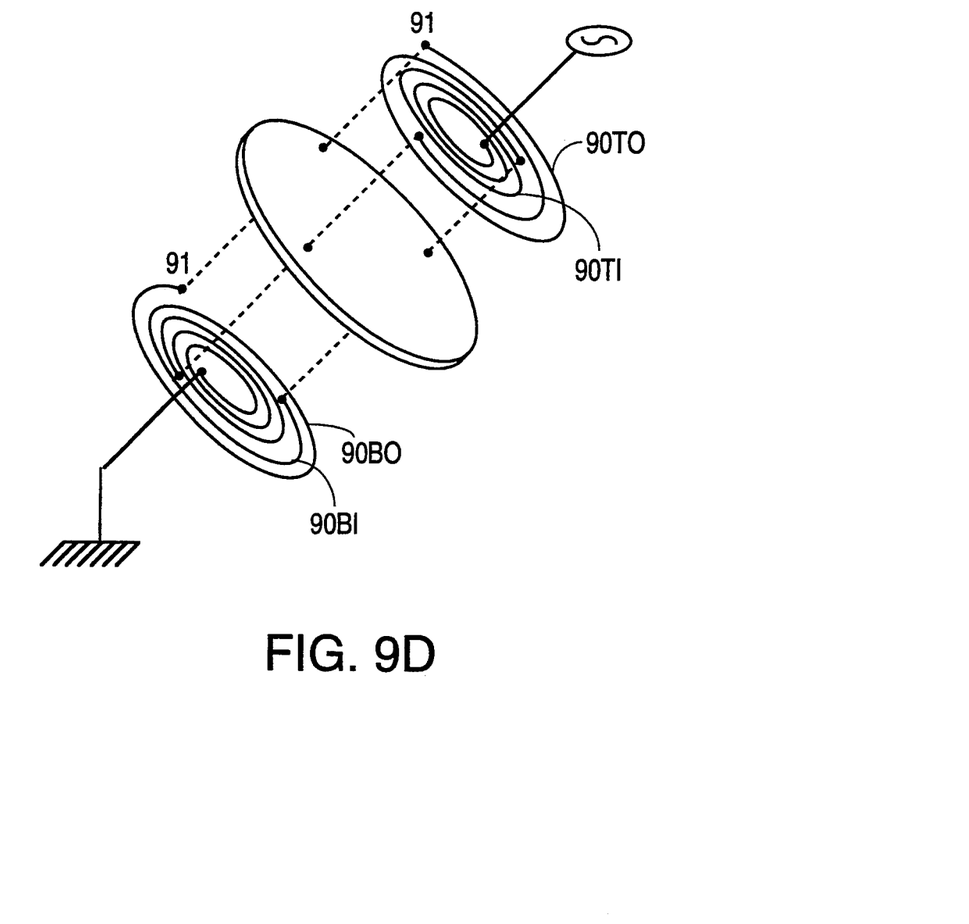
FIG. 9D illustrates an exploded view of the coil shown in FIG. 9A.
Figure 9E:
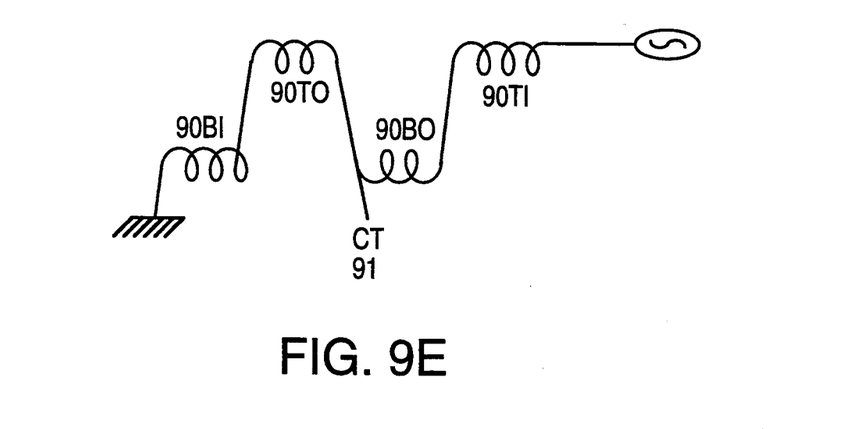
FIG. 9E illustrates an electrical schematic diagram of the coil shown in FIG. 9A.

FIG. 9A is a top plan view of another embodiment of the invention, providing balanced coupling to the plasma from each half of the coil. FIGS. 9B and 9C are cross-sectional views of this embodiment taken at sections 9B—9B and 9C—9C shown in FIG. 9A, and FIG. 9D is an exploded view of this embodiment. In FIG. 9A, portions of coil 90 on the top of the substrate are represented by solid lines; portions of coil 90 on the bottom side of the substrate are represented by dashed lines.

Coil 90 is essentially divided into four sections, which are defined by a central crossover 91 and two side crossovers 92 and 93. These sections include a top outer section (90TO), and top inner section (90TI), a bottom outer section (90BO), and a bottom inner section (90BI). This arrangement, which is illustrated schematically in FIG. 9E, permits balancing the path lengths of the inner segments 90TI and 90BI to the path lengths of the outer segments 90TO and 90BO. In this manner, the electrical properties of either side of the induction coil are balanced and symmetrical irrespective of imbalances caused by inductive coupling of the induction coil to adjacent conductive influences.

As illustrated in FIG. 9C, side crossovers 92 and 93 should occur along section 9C—9C (see FIG. 9A) to prevent a conflict between paths directly opposite each other on either side of the substrate. Inner sections 90TI and 90BI should be whatever length is needed to equalize the path lengths of these sections with the path lengths of outer sections 90TO and 90BO, respectively. This balanced structure is particularly well suited to use with a ferrite core, as illustrated in FIG. 8.

It will be appreciated that additional crossovers may be provided, effectively dividing the coil into additional sections on the top and bottom of the substrate. Moreover, any type of supporting member capable of providing a separation between the top spiral and the bottom spiral may be used in place of the substrate. All such embodiments are within the scope of this invention.

Referring again to FIGS. 4 and 5, a high-frequency generator (not shown) is located inside a lower portion 46 of the lamp 40. Lower portion 46 is preferably made of sheet metal for shielding the electromagnetic field. The high-frequency generator generates for example a 13.56 MHz high-frequency signal to energize induction coil 44. The discharge lamp 40 is compact, and has essentially the shape of conventional incandescent lamps.

Figure 10A:
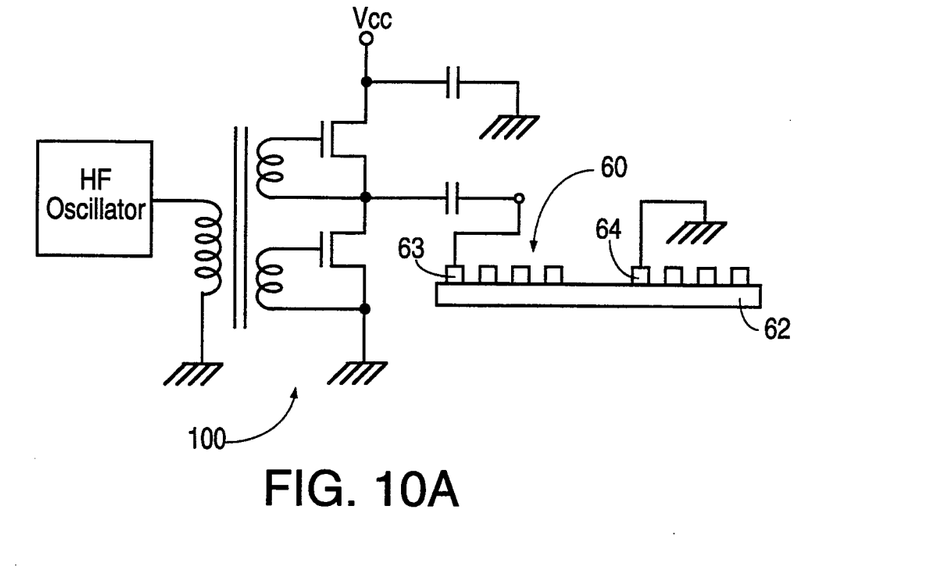
FIG. 10A is a schematic circuit diagram showing a single-sided spiral coil of the present invention driven by a Class D amplifier.

The high-frequency generator includes an oscillator and a power amplifier. These elements may be of various kinds known in the art. For example, a Class D power amplifier may be used to energize the induction coil. FIG. 10A shows a schematic circuit diagram of a Class D power amplifier 100 for energizing a single-sided coil 60 shown in FIGS. 6A and 6B. Amplifier 100 may be of the kind described, for example, in U.S. Pat. Nos. 4,390,813 and 4,383,203, which are incorporated herein by reference.

A double-sided coil of the kind shown in FIGS. 7A and 7B may also be driven by the Class D power amplifier. In this embodiment, the terminals 73 and 74 of coil 70 are connected to the output terminals of the Class D amplifier, and the crossover 72 is left floating.

Figure 10B:
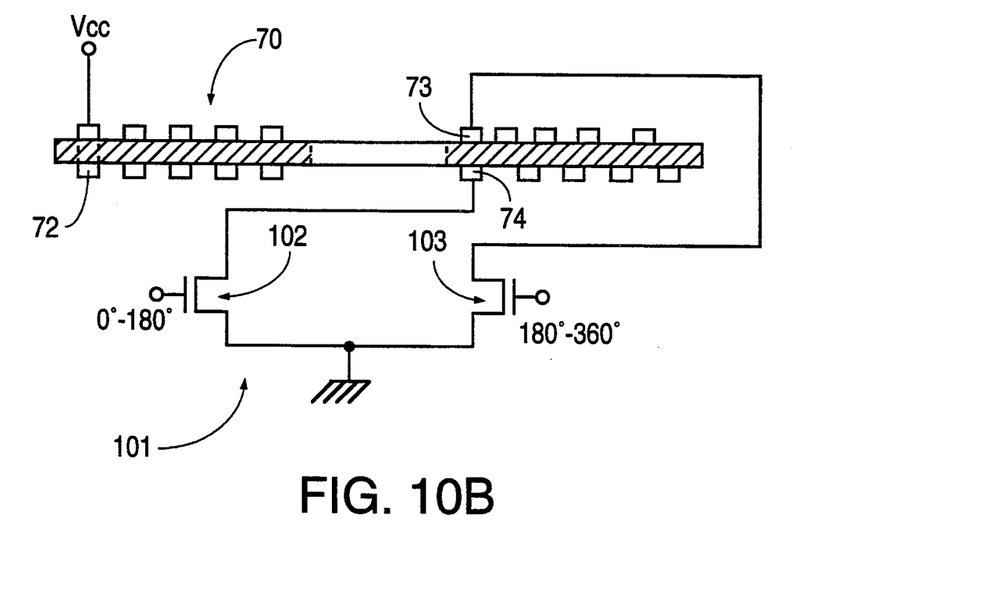
FIG. 10B is a circuit diagram showing a double-sided spiral coil of the present invention driven by a class E amplifier.

In accordance with another embodiment of the present invention, FIG. 10B illustrates a push-pull Class E amplifier 101 which energizes double-sided coil 70, shown in FIGS. 7A and 7B. Amplifier 101 contains switching transistors 102 and 103 which switch on and off 180 degrees out of phase with each other. The structure and operation of Class E amplifiers is described in U.S. Pat. No. 3,919,656 to Sokal et al., U.S. Pat. No. 4,245,178 to Justice, and U.S. patent application Ser. No. 07/894,020, filed on Jun. 5, 1992, each of which is incorporated herein by reference. In this embodiment, terminal 74 is connected to transistor 102, terminal 73 is connected to transistor 103 and $V_{cc}$ is connected to crossover 72. Coil 90, shown in FIGS. 9A–9D, is also very suitable for use with a Class E amplifier.

Figure 11:
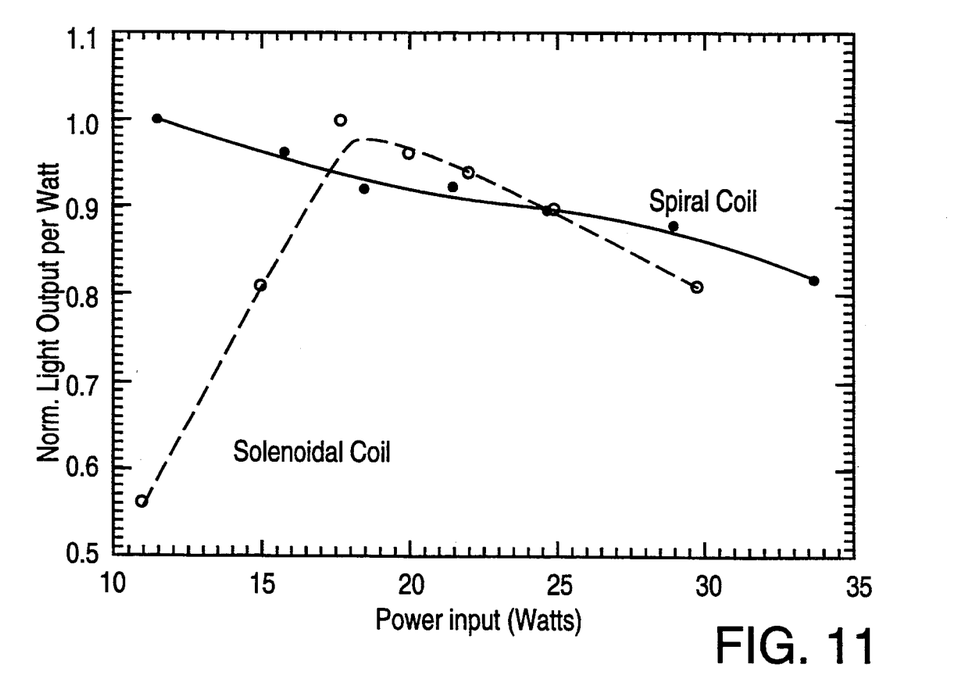
FIG. 11 illustrates diagrams of the relationship between the light output per watt and the HF power input for both the prior art lamp and the lamp of the present invention.

An electrodeless discharge lamp having a spiral induction coil shows a highly linear relationship between light output and power input, i.e., a highly linear dimming control characteristic. As shown in FIG. 3, the light output as a function of the power input is linear over a wide range. The light output per unit of power input (lumens per watt) is quite flat over the entire range, as shown by solid line in FIG. 11.

The linear relationship between light output and power input not only creates a good dimming characteristic, but it also provides scalability for the lamp. The power input to the spiral coil may be changed without re-engineering the discharge vessel and/or induction coil for optimum efficiency, since the lamp generates near maximum light output at any given watt-input. In the prior art, to scale up an electrodeless discharge light bulb from, for example, 12 watts to 25 watts, the discharge vessel, induction coil and HF generator had to be re-engineered in order to get the maximum light output per watt of power input. In contrast, with the lamp of this invention, the only thing that needs to be done is to change the HF generator. This makes manufacturing of the lamps more efficient, since one design of discharge vessel and spiral coil are suitable for lamps of different power ratings.

An electrodeless discharge lamp in accordance with the present invention also provides less radio frequency interference (RFI) compared with the prior art lamps having a solenoid induction coil. A solenoid coil basically radiates a dipole field, and such dipole field is proportional to the voltage across the solenoid times the axial length of the solenoid. The dipole field radiation in the present invention is minimized since the "length" of the coil is essentially zero.

Measurements of the RFI produced by a spiral coil show a reduction of at least 20 db as compared with a straight solenoid. This is the case in all directions and in terms of fundamental and the harmonics. The single-sided spiral coil has an RFI output 40 dB below the limit established by the FCC. The double-sided spiral coil is equivalent to two small dipoles which are opposed to each other, and the far fields generated by the two dipoles will cancel out. Therefore, the double-sided spiral coil is even better than the single-sided spiral in terms of RFI reduction.

The operation of a lamp in accordance with the present invention is similar to that of the lamp shown in FIG. 1. Before the lamp reaches a stationary discharge state, ignition of the discharge must occur. This is brought about by the E-field. This takes the form of a radial electric field Er, as shown in FIG. 6B, for single-spiral coil 60. The fields are coupled into the discharge vessel by means of the parasitic capacitance of the air and glass bottom wall and produce a conventional glow discharge. The capacitive discharge creates a "breakdown" of the gas. After this breakdown, enough charged particles are present, and the magnetic-field takes over, forming the inductively-coupled arc discharge as mentioned previously.

Figure 12A:
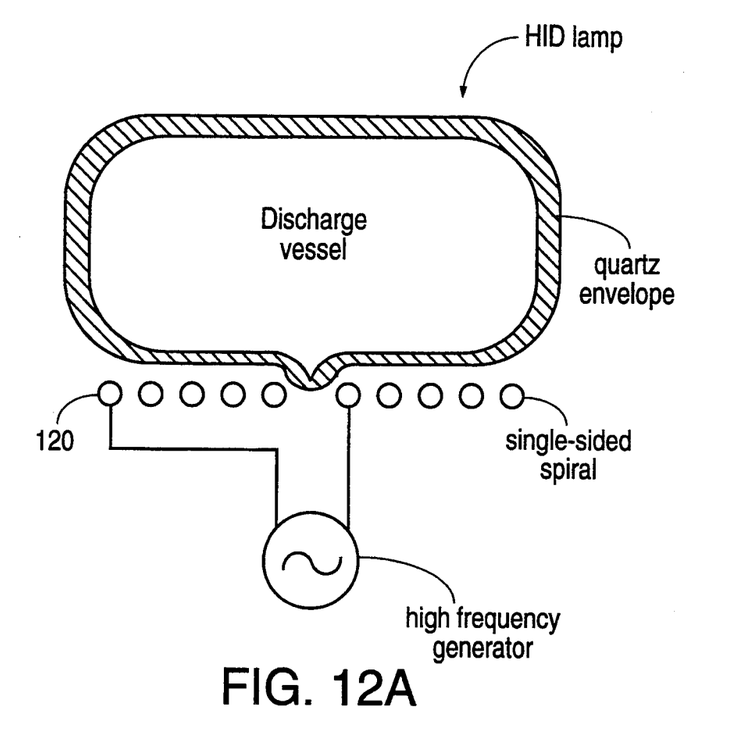
FIGS. 12A and 12B illustrate a single-sided spiral coil and a double-sided spiral coil used as induction coil in an HID lamp.
Figure 12B:
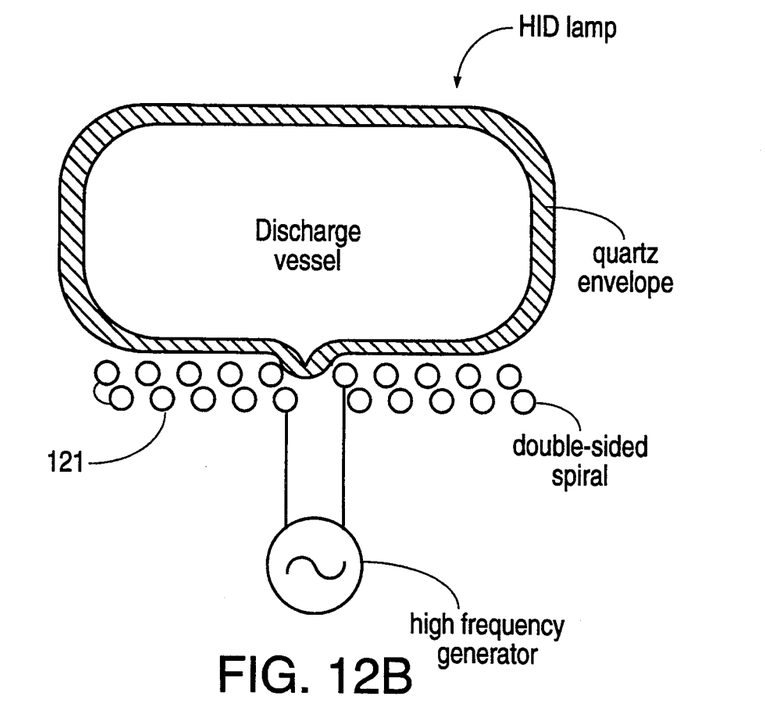

A spiral coil in accordance with the present invention can also be used as induction coil for high intensity discharge (HID) lamps. An HID lamp typically contains a mixture of mercury, sodium, or a metal halide vapor, and a noble gas in a quartz envelope. Breakdown of the gas mixture and plasma discharge are created in an HID lamp on essentially the same principle as in low pressure electrodeless discharge lamps. FIGS. 12A and 12B show schematically a single-sided spiral 120 and a double-sided spiral 121, respectively, used as an induction coil in an HID lamp.

Although the present invention has been described and illustrated in detail it is clearly understood that this is by way of illustration and example only and is not to be taken by way of limitation. The spirit and scope of the present invention is limited only by the terms of the appended claims.

What we claim is:

1. An electrodeless discharge lamp comprising:
   a discharge vessel containing an ionizable vapor; and
   a generator for providing a high-frequency signal to an induction coil;

the induction coil connected to the generator and disposed adjacent the discharge vessel, the induction coil comprising a conductive path shaped in the form of a substantially planar spiral.

2. A lamp as in claim 1, wherein the discharge vessel comprises a substantially flat bottom surface.

3. A lamp as in claim 1, wherein the induction coil comprises a second conductive path shaped in the form of a substantially planar spiral, said conductive paths together forming a double spiral.

4. A lamp as in claim 3, wherein said conductive paths are separated by a supporting member.

5. A lamp as in claim 3, wherein the generator comprises a Class D amplifier.

6. A lamp as in claim 3, wherein the generator comprises a Class E amplifier.

7. A lamp as in claim 4, wherein said conductive paths are formed on the two sides of a substrate.

8. A lamp as in claim 1, wherein the induction coil comprises a metal formed on a substrate.

9. A lamp as in claim 8, wherein the substrate is a printed circuit board.

10. A lamp as in claim 1, wherein said induction coil is formed on two sides of a supporting member, said induction coil comprising a series of coil sections, said coil sections being connected in series on alternate sides of said supporting member, each of said sections being in the shape of a spiral curve.

11. A lamp as in claim 1, wherein the induction coil is located near the outer periphery of the flat bottom surface of the vessel.

12. A lamp as in claim 1, wherein the generator comprises a Class D amplifier.

13. A lamp as in claim 1, wherein the generator is located inside a lower portion of the lamp below the induction coil.

14. A lamp as in claim 13, wherein the lower portion of the lamp includes a sheet of metal for shielding of electromagnetic field.

15. A discharge lamp comprising:
   an upper portion of the lamp formed by a discharge vessel, said discharge vessel including a flat bottom surface and a light-emitting surface;
   a spiral coil substantially in a single plane, located near the bottom surface of the discharge vessel for exciting an electromagnetic field inside the discharge vessel;
   a lower portion of the lamp including a high frequency power supply unit for supplying power to the spiral coil; and
   an Edison base located at the bottom of the lamp for connecting the high frequency power supply unit to external main power supply lines.

16. An electrodeless discharge lamp as in claim 11 wherein a wall of said vessel is coated with one or more phosphors.

* * * * *